US009183157B2

(12) United States Patent
Qiu et al.

(10) Patent No.: US 9,183,157 B2
(45) Date of Patent: Nov. 10, 2015

(54) METHOD FOR CREATING VIRTUAL MACHINE, A VIRTUAL MACHINE MONITOR, AND A VIRTUAL MACHINE SYSTEM

(75) Inventors: Jun Qiu, Hangzhou (CN); Chuan Ye, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 700 days.

(21) Appl. No.: 13/339,862

(22) Filed: Dec. 29, 2011

(65) Prior Publication Data

US 2012/0239850 A1    Sep. 20, 2012

Related U.S. Application Data

(63) Continuation of application No. PCT/CN2011/080573, filed on Oct. 9, 2011.

(30) Foreign Application Priority Data

Mar. 15, 2011 (CN) .......................... 2011 1 0061738

(51) Int. Cl.
| | |
|---|---|
| *G06F 12/02* | (2006.01) |
| *G06F 12/10* | (2006.01) |
| *G06F 9/455* | (2006.01) |
| *G06F 11/14* | (2006.01) |

(52) U.S. Cl.
CPC ............ *G06F 12/10* (2013.01); *G06F 9/45558* (2013.01); *G06F 11/1484* (2013.01); *G06F 12/0223* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| 7,222,221 B1 | 5/2007 | Agesen et al. |
| 2005/0235123 A1 | 10/2005 | Zimmer et al. |
| 2008/0133875 A1* | 6/2008 | Cohen et al. .................. 711/207 |

FOREIGN PATENT DOCUMENTS

| CN | 101158924 A | 4/2008 |
| CN | 101697134 A | 4/2010 |
| CN | 102141931 A | 8/2011 |

OTHER PUBLICATIONS

Michael R.Hines and Kartik Gopalan, Post-Copy Based Live Virtual Machine Migration Using Adaptive Pre-Paging and Dynamic Self-Ballooning, Mar. 11-13, 2009, ACM 978-1-60558-375.*
Extended European Search Report issued in corresponding European Patent Application No. 11799061.4, mailed Aug. 19, 2013, 9 pages.

(Continued)

*Primary Examiner* — Charles Rones
*Assistant Examiner* — Ryan Dare
(74) *Attorney, Agent, or Firm* — Brinks Gilson & Lione

(57) ABSTRACT

A method for creating virtual machine, a virtual machine monitor and a virtual machine system are provided in the embodiments of this application. The method comprises: mapping guest frame number (GFN) corresponding to a pseudo-physical memory of a virtual machine to a shared zero page, the shared zero page being a page having content of all zeros in physical memory; when the GFN is written by the virtual machine and if a page exception occurs, allocating a physical memory page to relieve the mapping relation between the guest frame number (GFN) and the shared zero page, and establishing a mapping relation between the guest frame number (GFN) and a machine frame number (MFN) of the physical memory page. The method can reduce the amount of memory used in virtual machine startup, improve virtual machine density, and support the concurrent startup of a memory overcommitted number of virtual machine.

12 Claims, 5 Drawing Sheets

(56) References Cited

OTHER PUBLICATIONS

Written Opinion of the International Searching Authority issued in corresponding PCT Patent Application No. PCT/CN2011/080573, mailed Dec. 29, 2011, 9 pages.

Hines et al., "Post-Copy Based Live Virtual Machines Migration Using Adaptive Pre-Paging and Dynamic Self-Ballooning" VEE'09, Washington, DC, Mar. 11-13, 2009, 10 pages.

International Search Report and Written Opinion of the International Searching Authority issued in corresponding PCT Patent Application No. PCT/CN2011/080573, mailed Dec. 29, 2011.

International Search Report issued in corresponding PCT Patent Application No. PCT/CN2011/080573, mailed Dec. 29, 2011.

Office Action issued in corresponding Chinese Patent Application No. 201110061738.5, mailed Feb. 17, 2013.

\* cited by examiner

METHOD FOR CREATING VIRTUAL MACHINE, A VIRTUAL MACHINE MONITOR, AND A VIRTUAL MACHINE SYSTEM

CROSS-REFERENCE TO RELATED APPLICATIONS

This application is a continuation of International Application No. PCT/CN2011/080573, filed on Oct. 9, 2011, which claims priority to Chinese Patent Application No. 201110061738.5, filed on Mar. 15, 2011, both of which are hereby incorporated by reference in their entireties.

FIELD OF THE APPLICATION

The present application relates to virtual machine techniques, and more specifically, to a method for creating virtual machine, a virtual machine monitor and a virtual machine system.

BACKGROUND OF THE APPLICATION

Virtualization technique is a decoupling method for separating underlying hardware devices from upper level operating system and applications, in which a virtual machine monitor (Virtual Machine Monitor, VMM) layer is introduced to directly manage underlying hardware resources, and virtual machine (Virtual Machine, VM) independent of underlying hardware are created and provided for upper level operating system and applications. Virtualization, as one of the underlying important foundational techniques of present popular cloud computing (Cloud Computing) platforms, may significantly improve resource utilization rate of physical devices. As shown in FIG. 1, after system virtualization, multiple VMs can simultaneously run on a single physical machine, the number of virtual machines (VMs) that are supported to run on a physical machine concurrently is called as virtual machine density (Virtual Machine Density), and the larger virtual machine density is, the higher resource utilization rate is.

In order to improve virtual machine density, some schedule mechanism is employed in CPU virtualization to enable a physical CPU to be shared by virtual CPUs of virtual machines, and in theory, arbitrary number of virtual CPUs are possible if performance is not concerned. Peripheral virtualization also can produce arbitrary number of virtual duplications through software simulation or connections to external subsystems, such as SAN (Storage Area Network). However, as to memory virtualization, the premise of providing one physical memory page to multiple virtual machines simultaneously is that those virtual machines have pages with exactly the same content, and therefore, in theory the amount of virtual memory can not exceed physical memory size. In order to exceed the limit of the amount of virtual memory imposed by physical memory size, a memory overcommitment method (in which the amount of virtual memory may exceed physical memory size) is proposed in this art, which comprises: balloon driver (Balloon Driver), content based page sharing (Content Based Page Sharing, CBPS), memory page swap (Memory Page Swap), memory page compression (Memory Page Compression) and populate on demand (PoD), etc.

Balloon driver (Balloon Driver) is installed in a guest operating system (Guest Operating System, GOS), which may induce memory release or allocation in the GOS, and corresponding memory is taken back or allocated to the GOS by the balloon driver, thereby achieving auto scaled memory adjustment.

Content based page sharing (CBPS) method may scan global physical pages and release redundant pages through sharing pages with the same content, thereby reducing the consumption of physical memory.

Memory page swap (Memory Page Swap) or memory page compression (Memory Page Compression) may swap several selected pages of a virtual machine to an external device such as a disk, or losslessly compress them to 1/n page size, so as to release memory for the use of more VMs.

PoD method allocates a specified amount of memory pages for each virtual machine as a memory pool (Memory Pool). The virtual machine virtual memory is set to NULL when starting up instead of mapping to physical pages, and physical pages are allocated from a memory pool only when the virtual memory is actually accessed.

The following defects of techniques in the prior art have been found by the inventors of this application through the development of this application:

Memory consumption during GOS starting up process after virtual machine creation is overlooked in all above schemes, but memory required by virtual machines are entirely allocated to those virtual machines initially and then part of the memory is reclaimed, which may cause that the number of virtual machines that can start up concurrently on a physical machine is restricted by the amount of physical memory, thereby lowering virtual machine density.

SUMMARY OF THE APPLICATION

A method for creating virtual machine, a virtual machine monitor and a virtual machine system are provided in the embodiments of this application.

In one aspect, a method for creating virtual machine is provided in the embodiments of this application, comprising: mapping guest frame number (GFN) corresponding to a pseudo-physical memory (Pseudo-physical Memory) of a virtual machine to a shared zero page, the shared zero page being a page having content of all zeros in the physical memory; when the GFN is written by the virtual machine and if a page exception occurs, allocating a physical memory page to relieve the mapping relation between the guest frame number (GFN) and the shared zero page, and establishing a mapping relation between the guest frame number (GFN) and a machine frame number (MFN) of the physical memory page.

In another aspect, a virtual machine system is provided in the embodiments of this application, comprising: a initialization virtual memory unit for mapping guest frame number (GFN) corresponding to a pseudo-physical memory of a virtual machine to a shared zero page, the shared zero page being a page having content of all zeros in the physical memory; a copy-on-write unit for, when the GFN is written by the virtual machine and if a page exception occurs, allocating a physical memory page to relieve the mapping relation between the guest frame number (GFN) and the shared zero page, and establishing a mapping relation between the guest frame number (GFN) and the machine frame number (MFN) of the physical memory page.

In further aspect, a virtual machine system is provided in the embodiments of this application, comprising: a virtual machine monitor and virtual machine; wherein the virtual machine monitor is used to map guest frame number (GFN) corresponding to a pseudo-physical memory of a virtual machine to a shared zero page, the shared zero page being a page having content of all zeros in the physical memory;

when the GFN is written by the virtual machine and if a page exception occurs, allocate a physical memory page to relieve the mapping relation between the guest frame number (GFN) and the shared zero page, and establish a mapping relation between the guest frame number (GFN) and a machine frame number (MFN) of the physical memory page.

In the above technical scheme provided in the embodiments of this application, the virtual machine monitor initializes virtual memory through mapping the pseudo-physical memory of a virtual machine to a shared zero page, causing that the creation of a virtual machine does not need to consume physical memory; when the virtual memory is to be used in virtualization, the virtual machine monitor allocates physical memory to the virtual machine through copy-on-write and relieves the mapping relation to the shared zero page, which may decrease the amount of memory used in virtual machine startup, thereby improving virtual machine density.

BRIEF DESCRIPTION OF THE DRAWINGS

In order to illustrate embodiments of this application and technical schemes in the prior art more clearly, accompanying drawings that are required in the description of those embodiments or the prior art will be briefly introduced below. Obviously, the accompanying drawings in the following description merely illustrate some embodiments of this application, and other accompanying drawings can be conceived based on those drawings without any inventive efforts by those skilled in the art.

DETAILED DESCRIPTION OF THE EMBODIMENTS

In order to make the objects, technical scheme and advantages of the embodiments of this application more clear, a distinct, complete description of the technical scheme of the embodiments of this application will be made in combination with the accompanying drawings of those embodiments. Obviously, those embodiments are merely a portion of but not all of possible embodiments of this application. Based on the embodiments of this application, other embodiments may occur to those skilled in the art without any inventive efforts, all of which are encompassed in the protection scope of this application.

Embodiment 1

Figure 1:
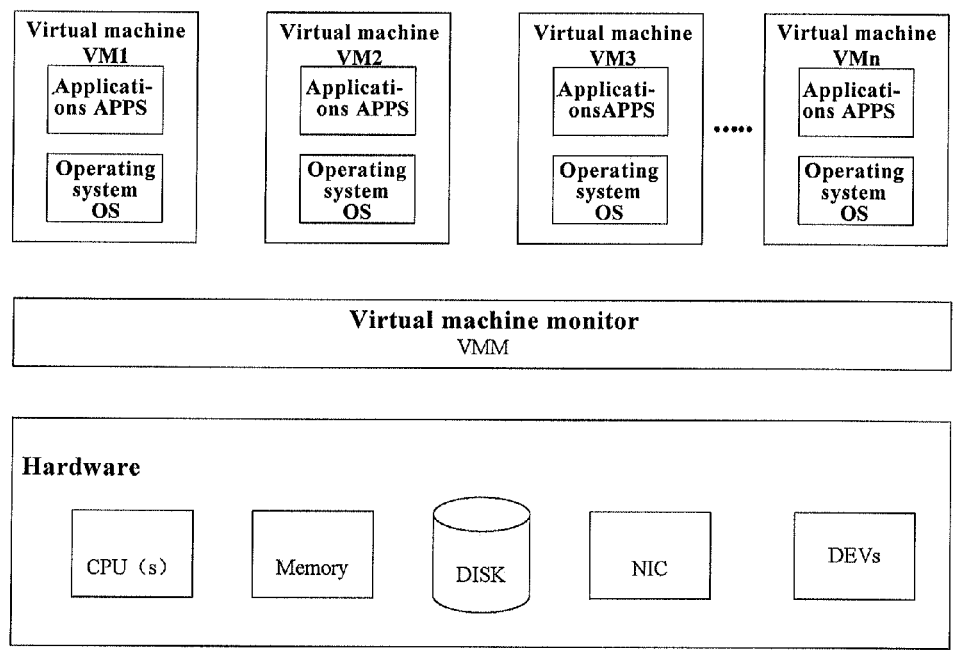
FIG. 1 is a schematic diagram of a virtual machine architecture in the prior art.
Figure 2:
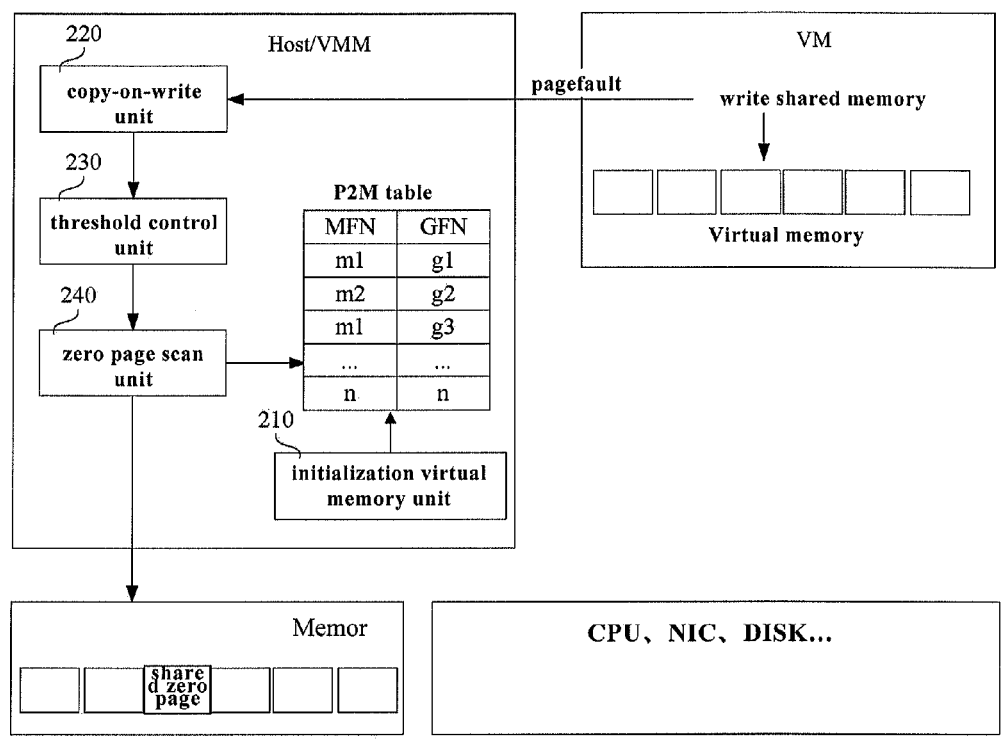
FIG. 2 is a structural diagram of a system of embodiment 1 and a device of embodiment 2 of this application.

FIG. 2 is a schematic diagram of a virtual machine architecture of an embodiment of this application. As shown in FIG. 2, the system comprises: a virtual machine monitor and virtual machine; wherein the virtual machine monitor is used to map guest frame number (GFN) corresponding to a pseudo-physical memory of a virtual machine to a shared zero page, the shared zero page being a page having content of all zeros in the physical memory; when the GFN is written by the virtual machine and if a page exception occurs, allocate a physical memory page to relieve the mapping relation between the guest frame number (GFN) and the shared zero page, and establish a mapping relation between the guest frame number (GFN) and a machine frame number (MFN) of the physical memory page.

Further, the virtual machine monitor also can be used to, after allocating a physical memory page to a virtual machine, update a memory use increment for that virtual machine; when the memory use increment reaches a predefined threshold, scan physical memory pages that have been allocated during virtual machine startup; release or add zero memory pages found into a memory pool, and then remap GFNs to the shared zero page; and set the memory use increment to zero after completing the scanning.

Referring to FIG. 2 again, a more detailed description will be given below:

Hardware layer: the hardware layer, as a complete hardware platform on which a virtualization environment is performed, may particularly comprise a CPU, memory (Memory), a network interface card (Network Interface Card, NIC), high speed I/O devices, such as external storage devices, and low speed devices, such as basic input/output devices.

Host or virtual machine monitor (VMM): the virtual machine monitor (VMM), as a management layer has essential functions of: achieving hardware resource management and allocation; rendering a virtual hardware platform for virtual machine; and implementing virtual machine schedule and isolation. Optionally, the cooperation with a privileged virtual machine is required in some VMM implementations to construct a host by combining both of them. The virtual machine hardware platform provides various hardware resources to virtual machine thereon, such as virtual CPU (VCPU), virtual memory, virtual disk, and virtual network interface card, etc. For a VM, the virtual memory is an isolated pseudo-physical memory space, which starts from 0 and is a continuous space. The VMM establishes a P2M table for each VM for translating GFNs to MFNs (Machine Frame Numbers), so that the virtual memory can be scattered in the physical memory.

One or more virtual machines (VMs): a VM executes on a virtual platform provisioned by the host. The execution of a virtual machine is not subject to the influence of the host at the most of time.

Preferably, mappings from GFNs to MFNs are recorded in the P2M table. As shown in a P2M table of FIG. 2, the P2M table is composed of P2M entries having MFNs specified therein. Taking a GFN as an index, a unique P2M entry and thereby a MFN can be found. Assuming a MFN of the shared zero page is m1, in the virtual machine creation stage, the host/VMM indexes the P2M table corresponding to that VM by all the GFNs corresponding to the pseudo-physical memory of that VM, populates m1 in location of each MFN in the P2M indexed by each GFN; given that a memory having a GFN of g2 is to be written after completing the creation of a virtual machine, and a page exception occurs, the host/VMM begins to handle this exception and allocates a physical memory page having for example a MFN of m2, the host/VMM, after cleaning the m2 memory page to zeros, populates m2 in the entry indexed by g2 of the P2M table, so that the mappings from g2 to the shared zero pager are relieved; in the zero page scanning stage, given that the host/VMM has found that the MFN memory page m3 corresponding to a virtual machine pseudo-physical memory having a GFN of g3 is a zero page, the host/VMM populates m1 in the entry indexed by g3 in the P2M table to remap it to the shared zero page; at last, m3 is reclaimed by the host/VMM and becomes a free memory page.

Optionally, the virtual machine monitor further can be used to, after allocating a physical memory page for the virtual machine, update a memory use increment of the virtual machine; when the memory use increment reaches a predefined threshold, scan physical memory pages that have been allocated during virtual machine startup; release or add zero memory pages found into a memory pool; remap their GFNs to the shared zero page; and set the memory use increment to zero after completing the scanning. In the embodiment of this application, instead of global scan, memory pages used during virtual machine startup are scanned in real time, so that scan efficiency can be improved and scan interval can be shorten. Wherein, the term "release" means the host/VMM reclaims one memory page to make it to become a free memory. Note that the memory use increment of a virtual machine is a count value, representing the number of GFNs having their original mappings to the shared zero page relieved due to memory writing by the virtual machine since a previous zero page scan; if it exceeds a threshold, a new zero page scan will be initiated. The count value, i.e., the memory use increment, is set to zero when the scan is completed for the start of a next counting cycle. That is, the memory use increment is the number of GFNs having their mappings to the shared zero page relieved during a zero page scan interval.

The system of this embodiment of this application may reduce the amount of memory consumed during virtual machine startup, improve virtual machine density, support the concurrent startup of virtual machines up to a memory overcommitted number, and make the amount of memory consumed during virtual machine startup monotonically increased.

Embodiment 2

A virtual machine monitor (VMM) is provided in embodiment 2 of this application. Continuing with FIG. 2, the virtual machine monitor comprises:

a initialization virtual memory unit 210 for mapping guest frame number (GFN) corresponding to a pseudo-physical memory of a virtual machine to a shared zero page, the shared zero page being a page having content of all zeros in the physical memory;

a copy-on-write unit 220 for when the GFN is written by the virtual machine and if a page exception occurs, allocating a physical memory page to relieve the mapping relation between the guest frame number (GFN) and the shared zero page, and establishing the mapping relation between the guest frame number (GFN) and a machine frame number (MFN) of the physical memory page.

Particularly, the initialization virtual memory unit 210 is particularly used to, in a P2M table of mappings from pseudo-physical memory addresses of that virtual machine to machine physical memory addresses, index all the GFNs corresponding to the pseudo-physical memory of the virtual machine to the machine frame number (MFN) of a shared zero page.

Particularly, the copy-on-write unit 220 is used to, in a P2M table of mappings from pseudo-physical memory addresses of that virtual machine to machine physical memory addresses, index guest frame numbers (GFNs) to machine frame numbers (MFNs) of physical memory pages.

Particularly, the initialization virtual memory unit 210 is used to map all the GFNs of the VM to the shared zero page allocated by the VMM. The initialization virtual memory unit 210 is invoked by the VMM when a virtual machine is created.

Since mappings from GFNs of the VM and the shared zero page belong to read only mappings, an exception may occur when a GFN mapped to the shared zero page is written by the VM. That exception can be captured by the VMM and the copy-on-write unit 220 can be invoked. The copy-on-write unit 220 has the following functions: first, it allocates a page of physical memory and cleans the page to zeros; then, it relieves the mapping relation from the GFN causing that exception to the shared zero page; at last, it remaps the GFN causing that exception to the MFN corresponding to the physical memory page allocated as above. The copy-on-write unit is further used to determine whether there are zero pages in the memory pool, and if so, take a zero page out of the pool and allocate it to the virtual machine.

In a preferable embodiment, as shown in FIG. 2, the virtual machine monitor further comprises: a threshold control unit 230 and a zero page scan unit 240. The threshold control unit 230 is used to determine whether the number of physical memory pages that have been allocated reaches a predefined threshold, and if so, initiate the zero page scan unit. The zero page scan unit 240 is used to scan the allocated physical memory pages as described above, and release zero pages that has been found by scan, or put them to the memory pool.

Particularly, the threshold control unit 230 is connected to the copy-on-write unit 220. Physical memory pages used by the VM continuously increases with continuous writing to GFNs mapped to the shared zero page by the VM, thus, the functions of the threshold control unit 230 comprise: determining whether the number of memory pages increased for the VM has exceeded a predefined threshold, and if the number of memory pages increased for the VM has exceeded the predefined threshold, initiating the zero page scan unit, for example, initiating the zero page scan unit when the amount of memory used by the VM is larger than 4096 pages.

The zero page scan unit 240 is connected to the threshold control unit 230. A large amount of GOS memory writing operations in VM startup are writing zeros to memory pages, thus the functions of the zero page scan unit 240 comprise: scanning physical memory pages allocated for the VM by invoking the copy-on-write unit after write exceptions trigged by the VM, to search those pages having content of all zeros of the allocated physical memory pages; remapping GFNs corresponding to those zero pages to the shared zero page; and releasing the physical memory pages previously mapped before those GFNs.

The copy-on-write unit 220 further may be used to determine whether there are zero pages in the memory pool, and if so, take a zero page out of the memory pool and allocate it to the virtual machine, otherwise, allocate a page from free memory to the virtual machine.

The virtual machine monitor of this embodiment of this application may reduce the amount of memory used during virtual machine startup, improve virtual machine density, support the concurrent startup of virtual machines up to a memory overcommitted number, and make the amount of memory consumed during virtual machine startup monotonically increased. If the amount of memory used by virtual machines is monotonically increased, it can be determined that the total amount of memory used by virtual machines at a certain time can not exceed a certain value, which can reduce the occurrence of memory overcommitted fault. If the plot of the amount of memory used by virtual machines versus time is a curve having peaks and troughs, it is impossible to determine how many virtual machines can start up concurrently. If the plot of the amount of memory used by virtual machines versus time is a line parallel to the time axis, the number of virtual machines that can start up concurrently is limited by physical memory size.

Embodiment 3

Figure 3:
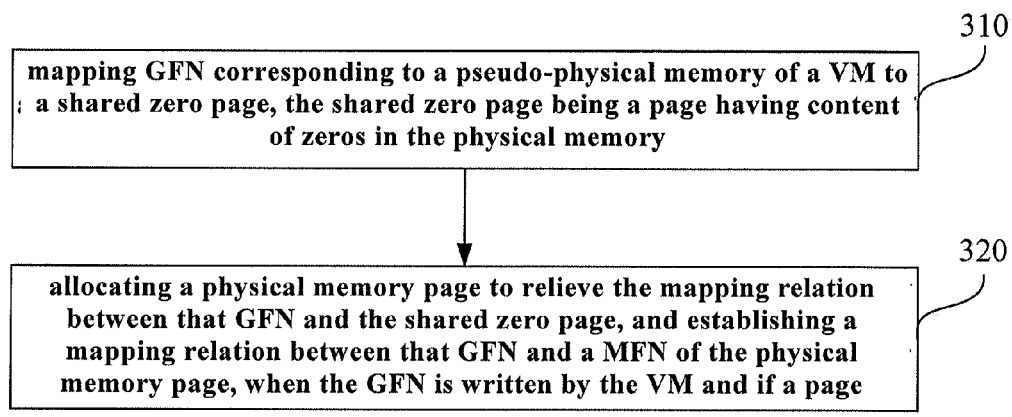
FIG. 3 is a flow chart of a method for creating virtual machine of embodiment 3 of this application.

A method for creating virtual machine is provided in embodiment 3 of this application. FIG. 3 is a general flowchart of a method for creating virtual machine according to embodiment 3 of this application. As shown in FIG. 3, the method comprises:

at step 310, mapping guest frame number (GFN) corresponding to a pseudo-physical memory of a virtual machine to a shared zero page, the shared zero page being a page having content of all zeros in the physical memory;

at step 320, when the GFN is written by the virtual machine and if a page exception occurs, allocating a physical memory page to relieve the mapping relation between that guest frame number (GFN) and the shared zero page, and establishing a mapping relation between that GFN) and a machine frame number (MFN) of the physical memory page.

Specifically, mapping guest frame number (GFN) corresponding to a pseudo-physical memory of a virtual machine to a shared zero page at step 310 may comprise: in a P2M table mapping pseudo-physical memory addresses of the virtual machine to machine physical memory addresses, indexing all the GFNs corresponding to the pseudo-physical memory of that virtual machine to a machine frame number (MFN) of the shared zero page.

Specifically, establishing a mapping between that guest frame number (GFN) and the machine frame number (MFN) of the physical memory page at step 320 may comprise: in the P2M table mapping pseudo-physical memory addresses of the virtual machine to machine physical memory addresses, indexing that guest frame number (GFN) to the machine frame number (MFN) of the physical memory page.

Preferably, after allocating physical memory page at step 320, the method of FIG. 3 may further comprise: determining whether the number of physical memory pages that have been allocated reaches a predefined threshold, and if so, scanning the physical memory pages that have been allocated, and releasing zero pages that have been found by the scan or putting them into a memory pool.

Preferably, allocating a physical memory page at step 320 may further comprise the following detailed procedure: determining whether there are zero pages in the memory pool, and if so, taking the zero page from the memory pool and allocating it to the virtual machine, otherwise, allocating a page from free memory to the virtual machine.

The method of embodiment 3 of this application may reduce the amount of memory consumed during virtual machine startup, improve virtual machine density, support the concurrent startup of virtual machines up to a memory overcommitted number, and make the amount of memory consumed during virtual machine startup monotonically increased.

The method of embodiment 3 will be described in further detail with embodiments 4 and 5 below.

Embodiment 4

The starting up of a virtual machine can be divided into two stages: first, in a virtual machine creation stage, a virtual machine is created and necessary resources are allocated, and the VMM allocates memory that has been cleaned to zeros to the virtual machine for the purpose of security; second, in a guest OS (Guest Operating System, GOS) startup stage, the memory is used by the GOS for two purposes, that is, for storing kernel codes and data and as a free memory, and the free memory is cleaned to zeros by the GOS for the purpose of security. It can be seen from the above analysis that either such virtual machine startup situation in existing memory overcommitted methods or memory usage of GOS during virtual machine startup is overlooked.

The above two situations are adequately considered in the embodiments of this application. At first, when creating a virtual machine, all guest memory pages are mapped to a shared machine physical page with zeros as all of its content, that is, a shared zero page. Then, the sharing is relieved through a CoW (Copy on Write) mechanism when an exception occurs due to virtual machine writing to a GFN (Guest Frame Number), and a memory use increment of the virtual machine is recorded. When the memory use increment exceeds a predefined threshold, zero page scan is initiated to search free pages that are all zeros. Pages with all zeros are released, and GFNs are remapped to the shared zero page. The amount of memory used in virtual machine startup can be further reduced through the above method.

Figure 4:
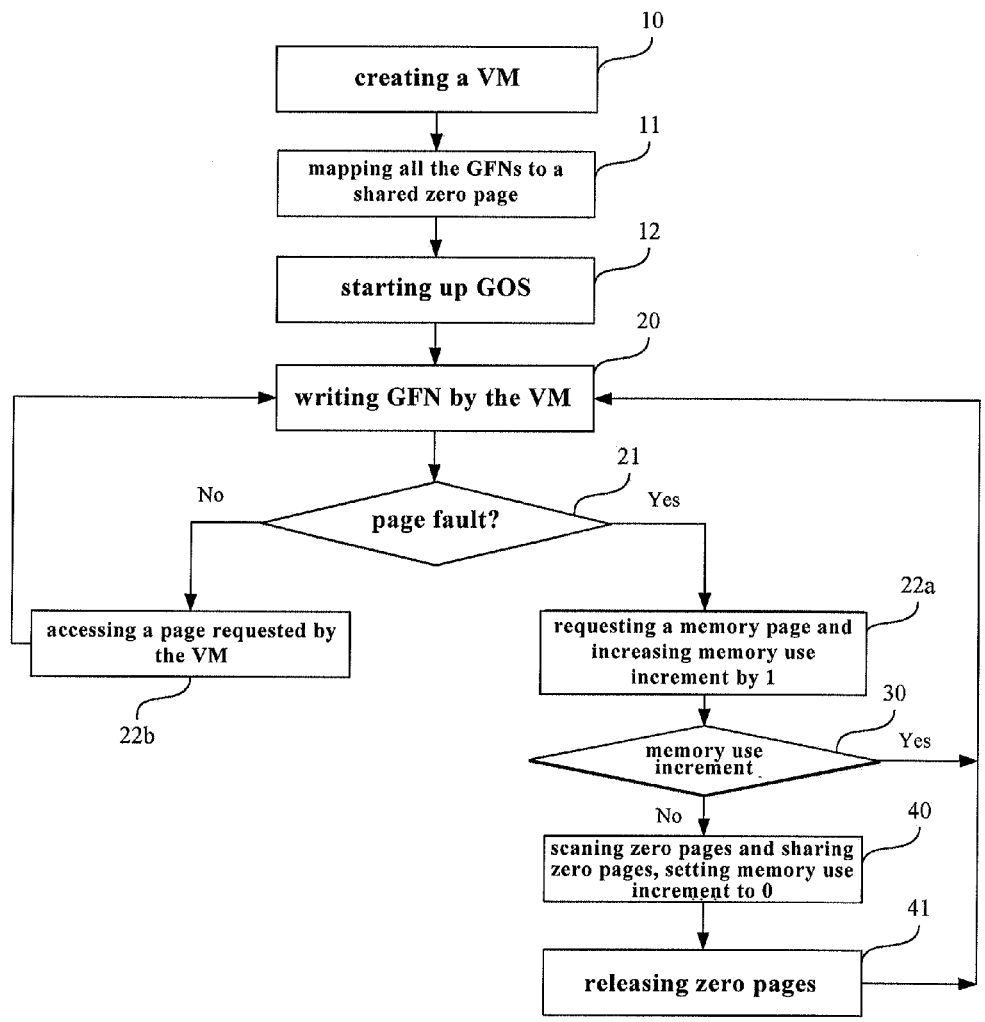
FIG. 4 is a flow chart of a method for creating virtual machine of embodiment 4 of this application.

FIG. 4 is a flowchart of the method of embodiment 4 of this application. With reference to FIGS. 2 and 4, the flowchart comprises the following steps:

Step 10: creating a VM;

Step 11: mapping all the GFNs to a shared zero page; a zero page is a memory page in a VM having zeros as all its data; the zero page is redundant for VMs, and it is sufficient to provide only one copy of the zero page for the whole system. Therefore, all the GFNs corresponding to zero pages in the VM are mapped to the zero page that is shared by VMs, which is called as shared zero page.

Step 12: starting up a guest operating system (GOS);

Specifically, at steps 10~12, a VM is created and a guest OS is started up. No physical memory resource is allocated to the VM when the virtual memory is created; instead, an initialization virtual memory unit maps all the GFNs of the VM to a shared zero page allocated by a VMM. Although the VM does not have any physical memory resource at that time, the guest OS still can be started up, because the VM can recognize all virtual memory having zeros as their content by means of a P2M table.

Step 20: writing a GFN by the VM;

Step 21: determining whether a PageFault occurs, if so, turning to step 22a, otherwise, turning to step 22b;

Step 22a: requesting a physical memory page by a CoW unit, updating the P2M table, increasing a memory use increment by 1; updating the P2M table referring to: relieving the mapping relation between the GFN accessed and the shared zero page, and mapping the GFN accessed to a requested physical memory page.

Step 22b: accessing the requested page by the VM;

Particularly, at steps 20, 21 and 22a, the VM starts to use the virtual memory with memory operations, comprising memory read and write. If the operation is memory write and the GFN accessed is mapped to the shared zero page, a PageFault exception will be generated by the processor. The VMM may begin to handle this exception. The CoW unit is invoked by the VMM to relieve the mapping relation between the accessed GFN and the shared zero page, and the accessed GFN is remapped to a newly allocated page having content of all zeros by the CoW unit. In such situation, the VMM also updates the counting of the memory use increment by adding 1 for that VM. Wherein, unmapping (i.e., relieving mapping) relation and remapping are performed by the CoW unit. At steps 20, 21 and 22b, if the GFN written by the VM is not mapped to the shared zero page, no PageFault exception will occur, and the VM may access its memory normally.

Step 30: determining whether the memory use increment of the VM is less than a predefined threshold, if so, turning to step 20, otherwise, turning to step 40;

Step 40: scanning zero pages and setting the memory use increment to zero;

Step 41: releasing zero pages.

Particularly, after requesting a physical memory page, unmapping and remapping relation by the CoW unit, a threshold control unit determines whether to initiate a zero page scan unit based on the relationship between the memory use increment and the predefined threshold. If it does not need to initiate the zero page scan unit, the VMM exits its exception handling and returns to the VM, and the VM continuous its execution, as shown at steps 30 and 20 of FIG. 4;

If the memory use increment has exceeded the threshold, the zero page scan unit is initiated. The size of the threshold can be specified in a virtual configuration file, or can be a default value specified by the VMM, e.g., 32 MB.

At step 40, if zero page scan is needed, the zero page scan unit scans physical memory pages that have been allocated to the VM, remaps GFNs corresponding to pages having content of all zeroes to the shared zero page, and releases those physical pages having content of all zeros and sets the memory use increment to 0. Scanning zero pages refers to finding out memory pages having content of all zeros of a VM. When scanning physical pages of a VM, it is possible to scan either all physical pages held by that VM or only memory pages increased. If only increased memory pages are to be scanned, after completing step 22*a*, corresponding MFNs, that is, MFNs corresponding to newly increased physical pages of the VM, should be recorded in a data structure, which can be data structure such as bitmap or link list etc. After which the flow exits from exception handling and returns to the VM, and the VM continuous its execution. The flow of FIG. 4 proceeds until a startup completion notification is received by the threshold control unit, which may be sent from the VMM per se, a privilege domain or a frontend driver of the VM.

The method of embodiment 4 of this application may reduce the amount of memory consumed during virtual machine startup, improve virtual machine density, support the concurrent startup of virtual machines up to a memory overcommitted number, and make the amount of memory consumed during virtual machine startup monotonically increased.

Embodiment 5:

In the flow of embodiment 4, the zero page scan unit directly releases physical memory pages after remapping zero pages to the shared zero page, while the CoW unit each time requests one physical memory page again. In order to improve performance, zero pages found by the zero page scan unit are placed into a memory pool in embodiment 5. The CoW at first obtains a page from the memory pool when a memory page is requested, and if the pool is empty, VMM allocates a physical page. With embodiment 5 of this application, repeated release upon request operations are reduced in the flow of this application, thereby improving efficiency.

Figure 5:
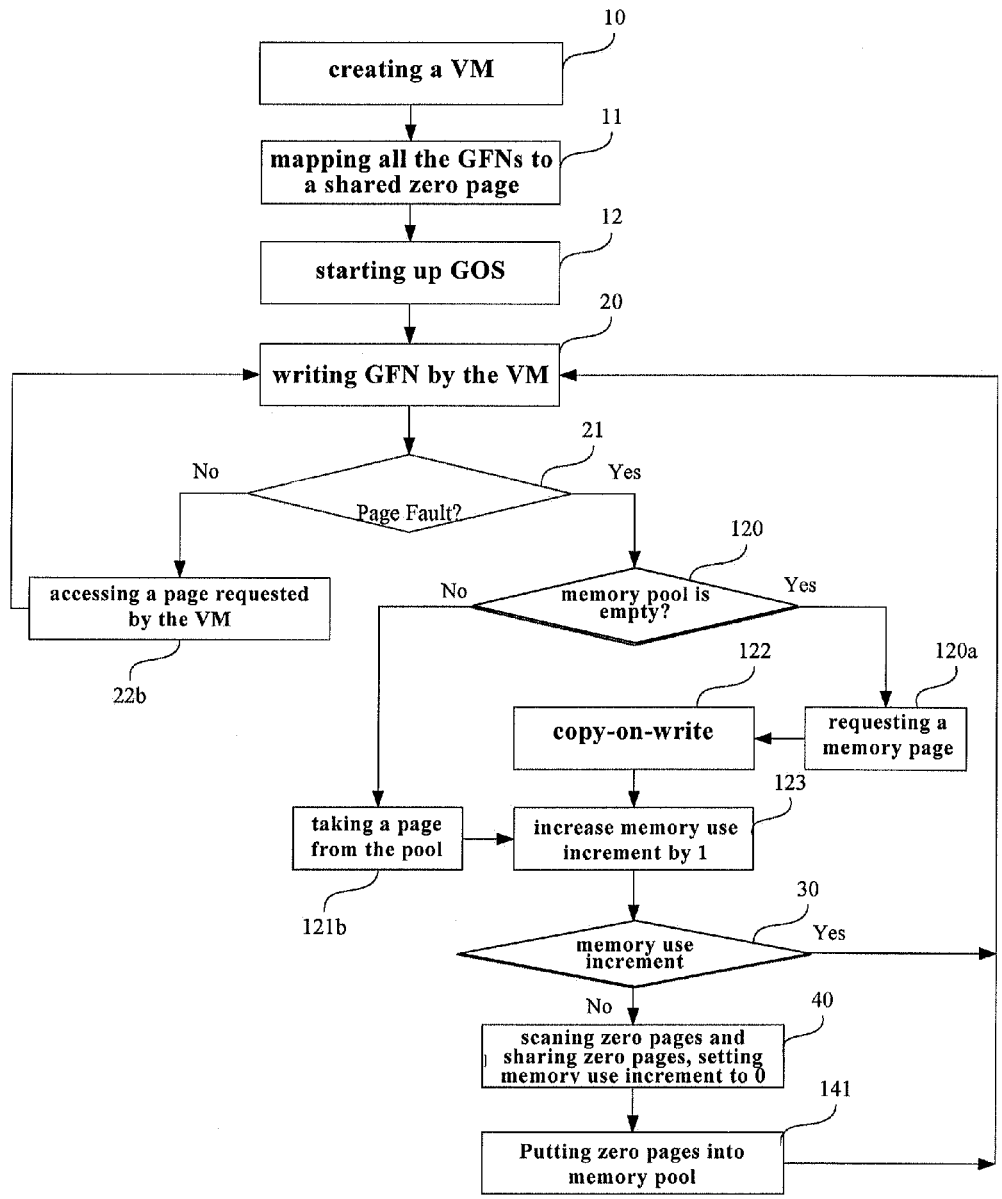
FIG. 5 is a flow chart of a method for creating virtual machine of embodiment 5 of this application.

The specific flow of embodiment 5 in FIG. 5 is similar to that of embodiment 4 in FIG. 4, except for the following differences:

First, step 22*a* of FIG. 4 corresponds to the following two situations of FIG. 5:

In one situation, as shown at steps 120, 121*b* and 123 of FIG. 5, when the memory pool is not empty, and when reallocating a page for a GFN, the VMM takes a page out of the memory pool, and maps the GFN to the MFN corresponding to that page, followed by increasing the memory use increment by 1.

In another situation, when the memory pool is empty, steps 120, 121*a*, 122 and 123 are performed for achieving the same operations as step 22*a* of FIG. 4. That is, the VMM reallocates a physical memory page and cleans it to zeros, then maps the GFN to the MFN corresponding to that physical memory page, and finally increases the memory use increment by 1.

Second, step 41 of FIG. 4 is turned into step 141 of FIG. 5. When finding pages with zeros as their complete content, the zero page scan unit maps GFN of those pages to the shared zero page, and then puts the zero pages found by scan into the memory pool.

After remapping GFNs of zero pages found by the zero page scan unit to the shared zero page, MFNs previously corresponding to those GFNs are put into the memory pool, from which the CoW unit obtains pages when requesting memory, thereby the step of releasing zero pages is not needed and is changed to putting zero pages into the memory pool. This is benefit for reducing repeated memory request and release operations.

It can be seen from the flow of embodiment 5, the size of the memory pool is unable to exceed the increment threshold, thereby a linear table data structure such as array or link list can be used for memory representation, which is advantageous for simplicity and efficiency.

The benefit effects produced by the embodiments of this application are: 1. saving the amount of memory used during virtual machine startup; 2. supporting the concurrent startup of a memory overcommitted number of virtual machines; the concurrent startup number is focused here, and since the method of the embodiments of this application can reduce memory consumed by VMs as much as possible, and the amount of memory used by VMs is increased monotonically, the number of VMs that may start up concurrently can be increased; 3. monotonically increased amount of memory used during virtual machine startup; 4. improved virtual machine density; 5. applicable to small-size computer virtualization, aggregation virtualization and other virtualization fields.

Those ordinary skilled persons in the art may appreciate that those units and steps in various examples described in connection with the embodiments disclosed in this application can be implemented as electrical hardware, computer software or a combination thereof. In order to clarify the exchangeability of hardware and software, components and steps of various examples have been generally described in terms of functions, and whether to implement those functions as hardware or software depends on specific applications and design restrictions of the technical scheme. Those skilled in the art can implement those functions described with different methods for different applications, however, those implementations should not be deemed as beyond the scope of this application.

The steps of method or algorithm described in connection with embodiments disclosed herein can be implemented by hardware, software modules executed on a processor or a combination thereof. Software modules can be loaded into random access memory (RAM), memory, read-only memory (ROM), EPROM, EEPROM, register, hard disk, removable disk, CD-ROM, or any other storage mediums that are well known in the art.

Some preferable embodiments have been described above, and the protection scope of this application is not limited thereto. Modifications or changes in the technical scope disclosed in this application may easily occur to those skilled in the art, which are encompassed in the protection scope of this application. Thus, the protection scope of this application should be in accordance with the following claims.

What is claimed is:

1. A method performed in a virtual machine monitor, wherein the method comprises:
   during virtual machine creation stage when starting up a virtual machine, mapping a plurality of guest frame numbers (GFNs) corresponding to a plurality of pseudo-physical memories of the virtual machine to a same shared zero page, the shared zero page being a page having content of all zeros in physical memory; and
   during Guest Operating System (GOS) startup stage when starting up the virtual machine, when one of a plurality of pseudo-physical memories is written by the virtual machine and if a page exception occurs:
      allocating a physical memory page other than the shared zero page to relieve the mapping relation between the one of the plurality of guest frame numbers (GFNs) corresponding to the one of the plurality of pseudo-physical memories written by the virtual machine and the shared zero page, and
      establishing a mapping relation between the one of the plurality of guest frame numbers (GFNs) corresponding to the one of the plurality of pseudo-physical memories written by the virtual machine and a machine frame number (MFN) of the physical memory page.

2. The method according to claim 1, wherein the mapping a plurality of guest frame numbers (GFNs) corresponding to a plurality of pseudo-physical memories of the virtual machine to a shared zero page comprises:
   in a table of mappings from pseudo-physical memory addresses of the virtual machine to machine physical memory addresses, indexing all the GFNs corresponding to the plurality of pseudo-physical memories of the virtual machine to a machine frame number (MFN) of the shared zero page.

3. The method according to claim 1, wherein the establishing a mapping relation between the one of the plurality of guest frame numbers (GFNs) corresponding to the one of the plurality of pseudo-physical memories written by the virtual machine and the machine frame number (MFN) of the physical memory page comprises:
   in a table of mappings from pseudo-physical memory addresses of the virtual machine to machine physical memory addresses, indexing the one of the plurality of guest frame numbers (GFNs) corresponding to the one of the plurality of pseudo-physical memories written by the virtual machine to the machine frame number (MFN) of the physical memory page.

4. The method according to claim 1, wherein, after allocating a physical memory page, the method further comprises:
   determining whether the number of physical memory pages that have been allocated reaches a predefined threshold, if so, scanning the physical memory pages that have been allocated, and releasing zero pages that have been found by the scan or putting them into a memory pool.

5. The method according to claim 1, wherein, the allocating a physical memory page comprises:
   determining whether there is a zero page in a memory pool, if so, taking the zero page from the memory pool and allocating it to the virtual machine, otherwise, allocating a page from free memory to the virtual machine.

6. A device for monitoring a virtual machine, wherein the device comprises:
   a processor configured to:
   during virtual machine creation stage when starting up a virtual machine, map a plurality of guest frame numbers (GFNs) corresponding to a plurality of pseudo-physical memories of the virtual machine to a same shared zero page, wherein the shared zero page being a page having content of all zeros in the physical memory; and
   during Guest Operating System (GOS) startup stage when starting up the virtual machine, when one of a plurality of pseudo-physical memories is written by the virtual machine and if a page exception occurs:
      allocate a physical memory page other than the shared zero page to relieve the mapping relation between the one of the plurality of guest frame numbers (GFNs) corresponding to the one of the plurality of pseudo-physical memories written by the virtual machine and the shared zero page, and
      establish a mapping relation between the one of the plurality of guest frame numbers (GFNs) corresponding to the one of the plurality of pseudo-physical memories written by the virtual machine and a machine frame number (MFN) of the physical memory page.

7. The device according to claim 6, wherein the processor is further configured to index all the GFNs corresponding to the plurality of pseudo-physical memories of the virtual machine to a machine frame number (MFN) of the shared zero page in a table of mappings from pseudo-physical memory addresses of the virtual machine to machine physical memory addresses.

8. The device according to claim 6, wherein the processor is further configured to index the one of the plurality of guest frame numbers (GFNs) corresponding to the one of the plurality of pseudo-physical memories written by the virtual machine to the machine frame number (MFN) of the physical memory page in a table of mappings from pseudo-physical memory addresses of that virtual machine to physical memory addresses.

9. The device according to claim 6, wherein the processor is further configured to:
   determine whether the number of physical memory pages that have been allocated reaches a predefined threshold, and if so, scan the allocated physical memory pages, and release zero pages that have been found by scan, or put them into a memory pool.

10. The device according to claim 6, wherein the processor is further configured to determine whether there is a zero page in the memory pool, if so, take the zero page out of the memory pool and allocate it to the virtual machine, otherwise, allocate a page from free memory to the virtual machine.

11. A virtual machine system, wherein the system comprises:
    a processor configured to run a virtual machine;
    wherein the processor is further configured to, during virtual machine creation stage when starting up the virtual machine, map a plurality of guest frame numbers (GFNs) corresponding to a plurality of pseudo-physical memories of the virtual machine to a same shared zero page, the shared zero page being a page having content of all zeros in the physical memory; and, during Guest Operating System (GOS) startup stage when starting up the virtual machine, when one of a plurality of pseudo-physical memories is written by the virtual machine and if a page exception occurs:
       allocate a physical memory page other than the shared zero page to relieve the mapping relation between the one of the plurality of guest frame numbers (GFNs) corresponding to the one of the plurality of pseudo-physical memories written by the virtual machine and the shared zero page, and establish a mapping relation between the one of the plurality of guest frame numbers (GFNs) corresponding to the one of the plurality of pseudo-physical memories written by the virtual machine and a machine frame number (MFN) of the physical memory page.

12. The system according to claim 11, wherein the processor is further configured to, after allocating a physical memory page to the virtual machine, update a memory use increment of the virtual machine; when the memory use increment reaches a predefined threshold, scan physical memory pages that have been allocated during virtual machine startup, release zero memory pages that have been found or add them to a memory pool; remaps the plurality of GFNs corresponding to the zero memory pages to the shared zero page; and set the memory use increment to zero after completing the scanning.

* * * * *